United States Patent [19]
Street

[11] Patent Number: 5,936,230
[45] Date of Patent: Aug. 10, 1999

[54] HIGH LIGHT COLLECTION X-RAY IMAGE SENSOR ARRAY

[75] Inventor: Robert A. Street, Palo Alto, Calif.

[73] Assignee: Xerox Corporation, Stamford, Conn.

[21] Appl. No.: 08/752,675

[22] Filed: Nov. 19, 1996

[51] Int. Cl.[6] .................................. G01T 1/20; G01T 1/24
[52] U.S. Cl. .................................. 250/214 VT; 250/368; 250/370.09; 250/370.11; 257/53
[58] Field of Search ........................... 250/208.1, 214 R, 250/216, 207, 214 VT, 368, 370.08, 370.09, 370.11, 214 LA; 257/52, 53, 59, 72, 431, 432, 436, 443

[56] References Cited

U.S. PATENT DOCUMENTS

| | | | |
|---|---|---|---|
| 4,745,451 | 5/1988 | Webb et al. | 257/436 |
| 4,781,767 | 11/1988 | Toda et al. | 257/436 |
| 4,982,095 | 1/1991 | Takahashi et al. | 250/370.11 |
| 5,017,989 | 5/1991 | Street et al. . | |
| 5,117,114 | 5/1992 | Street et al. | 250/370.11 |
| 5,164,809 | 11/1992 | Street et al. . | |
| 5,252,831 | 10/1993 | Weiss | 250/370.11 |
| 5,262,649 | 11/1993 | Antonuk et al. . | |
| 5,281,804 | 1/1994 | Shirasaki | 257/436 |
| 5,440,129 | 8/1995 | Schmidt | 250/370.11 |
| 5,442,179 | 8/1995 | Ohishi | 250/368 |
| 5,475,212 | 12/1995 | Nelson et al. . | |
| 5,616,924 | 4/1997 | Petrillo | 250/368 |
| 5,652,429 | 7/1997 | Genna | 250/368 |
| 5,763,887 | 6/1998 | Murphy | 250/366 |
| 5,773,829 | 6/1998 | Iwanczyk et al. | 250/370.09 |

OTHER PUBLICATIONS

Street, et al., "Amorphous Silicon Arrays Develop a Medical Image", *IEEE, Circuits and Devices*, Jul. 1993, pp. 38–42.

*Primary Examiner*—Edward P. Westin
*Assistant Examiner*—John R. Lee
*Attorney, Agent, or Firm*—Fay, Sharpe, Beall, Fagan, Minnich & McKee, LLP

[57] ABSTRACT

An assembly is provided for detection of radiation directed through an object. A phosphor converter disposed to receive the radiation pattern generates visible light representative of the radiation pattern. A plurality of light sensors are disposed to define a sensor array for receiving the visible light and generating a pixel signal pattern representative of the radiation pattern. A plurality of reflectors are disposed at locations for reflecting a portion of the visible light radiating in a direction to avoid being received in the plurality of light sensors. The light is reflected back into the phosphor converter where a diffuse reflection of the reflected light redirects the light back towards the sensors.

17 Claims, 2 Drawing Sheets

HIGH LIGHT COLLECTION X-RAY IMAGE SENSOR ARRAY

BACKGROUND OF THE INVENTION

1. Field of the Invention

This subject invention pertains generally to the field of imaging devices, and in particular to those devices containing a sensor array. The invention is most particularly applicable to an X-ray image sensor array wherein high energy radiation is converted by a phosphor converter to visible light that is sensed by the sensor array for real time radiation imaging.

2. Background Art

Amorphous silicon two-dimensional sensor arrays are well-known devices for real time imaging of incident high energy radiation (see R. A. Street et al., "Amorphous Silicon Arrays Develop a Medical Image", *IEEE Circuits and Devices*, July 1993, pp. 38–42, for a general description of the structure of the arrays). Such sensor arrays are particularly advantageous for radiation imaging because they present a relatively large size image sensor array. Sensor arrays operate on the principal of integrating a charge representative of the quantities of visible light incident on the sensor. A phosphor converter-generates the visible light from incident high energy radiation. Such phosphor converters are well-known and generally operate by absorbing X-ray photons to produce high energy electrons which, in turn, generate electron hole pairs, which in turn form visible light when the electrons and holes recombine. It can thus be appreciated that the amount of visible light generated in the phosphor converter is directly related to the radiation incident on the phosphor.

In the x-ray imaging applications of amorphous silicon 2-d sensor arrays, a phosphor is placed in contact with the array surface, and light emitted by the phosphor is collected by the array. A high collection efficiency of the emitted light is a critical factor in the performance quality of the imager. Lowering the collection efficiency reduces the signal, and reduces the detective quantum efficiency (DQE), both because the quantum statistics are degraded by incomplete capture of the light and because the readout electronic noise is a larger fraction of the signals. Loss of DQE seriously affects the viability of a medical imaging product, because it directly affects patient x-ray dose.

A principal objective of any sensor array is thus to have a high light collection efficiency. To the extent that any light is lost or not sensed by the sensor array, loss of resolution and inefficiency in representation of the incident radiation occurs.

With reference to FIG. 1, the sensor array of an imager that is collecting the visible light is made up of a plurality of individual pixels 10, which collectively will represent the image generated by the imager. The light is generated in the phosphor converter 30 from radiation incident thereon. Each pixel typically contains an individual light sensor 12, a transistor 14 that functions as a switch to communicate a signal representative of the sensed light, and various metallization lines that allow the representative image to be read out to an external device. The metallization lines comprise gate lines 16 running in one direction that attach the sensor gate to the transistor, a plurality of data lines 18 running orthogonally to the gate lines for communicating the representative signal out to the external electronic device and a bias connection 20 to the sensor 12. As can be seen in FIG. 1, each of the silicon sensors is spaced from an adjacent sensor to accommodate the various metallization lines.

The sensor acts as a charge integrator. As light falls on it, it charges up and it continues to charge up until the transistor is switched on. In other words, the sensor operates in a first phase where it merely accumulates a charge representative of the amount of visible light incident on it, and then operates in a second "readout" phase when a pulse is applied to the gate line which turns on all the gates of those sensors in a column to which the particular pulse gate line is attached. The pulse causes the charge on the sensors to be transferred to the data lines for that column of sensors. Such an output essentially resets the sensors in the column back to zero so that they can then start the collecting of charge again.

Conventionally, once one column has been read out, the next column is immediately pulsed so that the entire array is sequentially read out from one side to the other.

As noted above, due to the requirement of the metallization lines to communicate the collected charge, the individual sensors are spaced so the sensor space which is available to collect visible light cannot cover the whole area of the pixel. The industry describes the percentage of area of the sensor array actually consumed by sensors as the "fill factor". It is desirable, of course, to have as high a fill factor as possible because fill factor is directly representative of the efficiency of the sensor array to collect the available visible light. Unfortunately, it is the nature of the technology illustrated in FIG. 1, that the fill factor can never be one hundred percent as the result of the necessity of the metallization communication lines.

Additionally, it is desirable to reduce the size of the pixel to increase the resolution of the image. As a consequence of this design goal, the metallization lines will consume a higher percentage of a space relative to a reduced size sensor so the fill factor will get accordingly smaller and smaller, and overall device sensitivity will decrease. Keeping in mind that only the fraction of the area of the array that exposes a sensor is capable of receiving light, if the fill factor is 25%, then the maximum fraction of light received is 25% and approximately 75% of the visible light generated by the phosphor converter is lost.

The present invention contemplates a new and improved device which overcomes the problem of lost light to provide a new high light efficiency collection X-ray image sensor array despite a low sensor fill factor. The invention is simple in design, economical to manufacture, readily adaptable to a plurality of particular sensor configuration and provides increased sensitivity of detection. Most importantly, the invention has the consequence of minimizing the necessary radiation dosage in medical imaging applications.

BRIEF SUMMARY OF THE INVENTION

In accordance with the present invention there is provided a method and assembly for detection of radiation directed through an object for which a representative image is desired to be generated. A radiation source is associated with the object for generating a radiation pattern comprising high energy incident radiation to the assembly wherein the radiation pattern can represent an aspect of the object. A phosphor converter is disposed to receive the radiation pattern and generate visible light representative of the radiation pattern. A plurality of light sensors disposed as pixels define a sensor array for receiving the visible light and generate a pixel signal pattern representative of the radiation pattern. An electrical control circuit is in operative communication with the plurality of sensors for generating an electrical signal pattern representative of the pixel signal pattern. A plurality of reflectors are disposed at selected locations for reflecting that portion of the visible light radiating in a direction that prevents them from being received in any of the light sensors. The reflectors reflect the visible light back into the phosphor converter where diffuse reflection of the reflected visible light in the phosphor redirects the light back towards the sensors.

The reflector is preferably comprised of a plurality of segmented reflective areas disposed generally among the plurality of light sensors and intermediate of the phosphor converter and the light sensors. Segmenting of the reflection is advantageous to avoid extra capacitance, and to avoid capacitative coupling between the different metal lines, both of which can cause increased electronic noise resulting in a poorer image.

In accordance with a more limited aspect of the present invention, the sensor array includes a passivation layer and the reflectors are disposed on the passivation layer. The reflector preferably comprises a metal such as chromium or aluminum.

In accordance with the present invention, an improved sensor array is provided comprised of a plurality of amorphous silicon sensors adapted to receive light signals representative of a characteristic of an object wherein the sensors are spaced by a plurality of spaces about the sensors and function as an associated set of pixels. A plurality of reflective areas disposed to be generally coextensive of the spaces preclude light signals from passing between the sensors.

In accordance with the present invention, an imaging apparatus is provided comprising a sensor array of spaced amorphous silicon sensors including control circuitry for detecting electrical signals from the sensors representative of the light signals incident on the sensors. A phosphor converter generates the light signals from radiation incident on the phosphor converter. A reflector, positioned generally between the sensor array and the phosphor converter, intercepts the light signals that would miss being sensed by the spaced sensors and reflects the missing light signals back into the phosphor converter for diffuse reflection back to the sensors.

One benefit obtained by use of the present invention is a highly efficient light collection image sensor array, which has a high light collection efficiency despite a low sensor fill factor.

Another benefit of the subject invention is an image sensor array which allows relatively reduced sizes for amorphous silicon sensors of the array for improved array resolution by collecting a higher percentage of light than prior art devices by reflecting the light back to the sensors.

Yet another benefit and advantage of the present invention is that in medical x-ray imaging, the subject invention allows for reduction in the x-ray dosage by relatively maximizing the collection efficiency in the sensor array of incident radiation.

Other benefits and advantages of the subject new imaging apparatus will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in the specification and illustrated in the accompanying drawings, which form a part hereof and wherein.

DETAILED DESCRIPTION OF THE INVENTION

Figure 1:
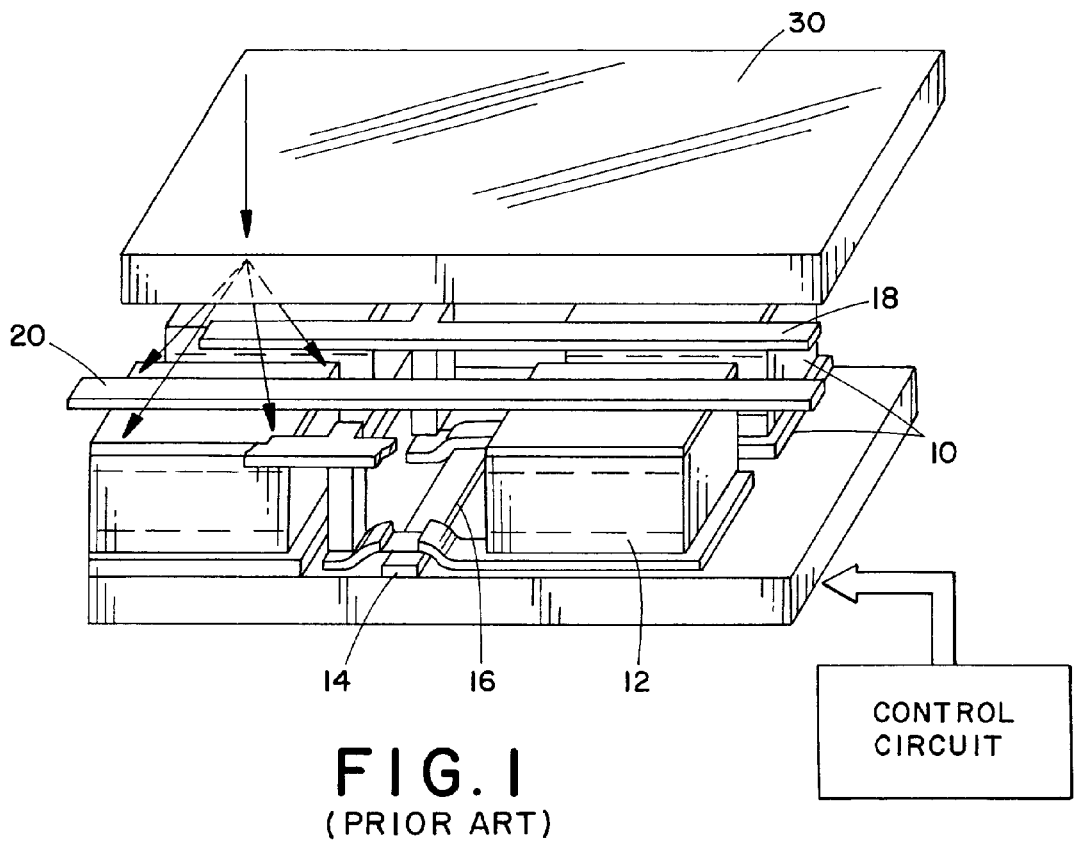
FIG. 1 is a perspective view in partial section of a prior known structure of an amorphous silicon sensor array.
Figure 2:
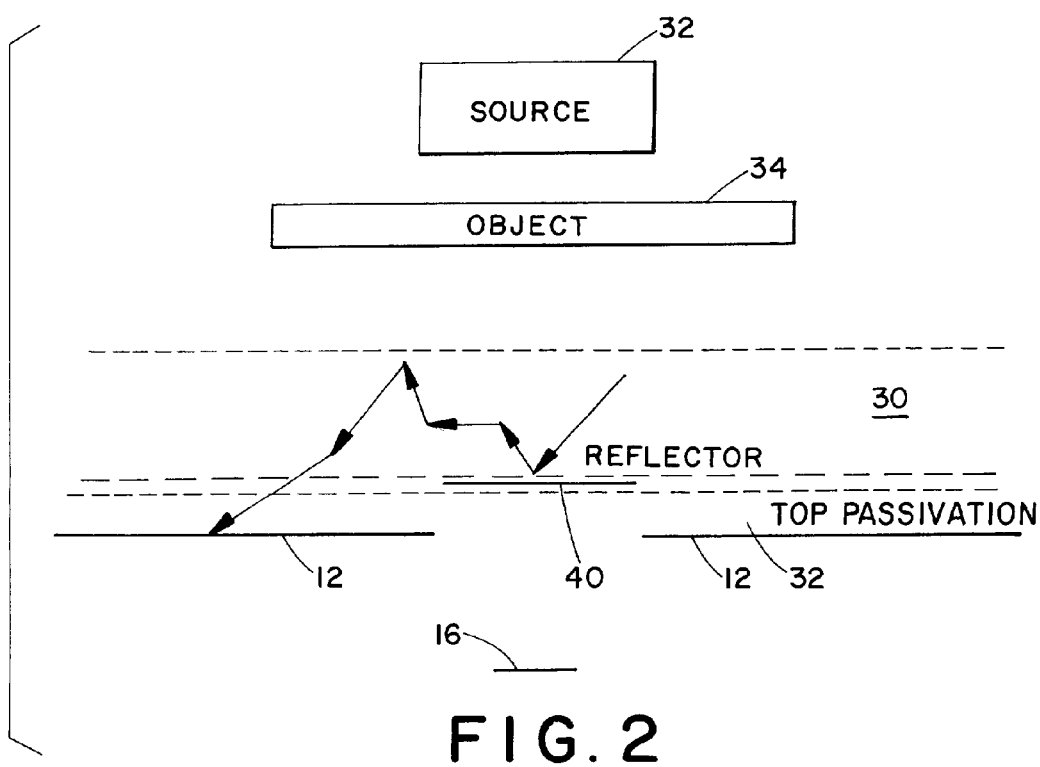
FIG. 2 is a schematic cross-sectional view particularly illustrating the positioning of a reflector generally between two spaced sensors; and, FIG. 3 shows one possible arrangement of segmented reflectors and sensors.

Referring now to the drawings wherein the showings are for the purpose of illustrating the preferred embodiments of the invention only, and not for purposes of limiting same, FIG. 2 shows a radiation source 32 of high energy radiation beams being directed through an imaging object 34. The object can be organic such as for medical imaging or non-organic for a variety of industrial or commercial applications. A reflector 40 is disposed generally intermediate first and second amorphous silicon sensors 12 and positioned so that visible light generated in the phosphor converter 30 which would normally be radiated in a direction to miss the sensors 12, is reflected back into the phosphor converter 30 for diffuse reflection therein and ultimate radiation back towards one of the sensors for collection. The FIGURE illustrates the diffuse reflection in the phosphor of a beam reflected by the reflector 40. The subject invention thus relies on the diffuse reflection properties of the phosphor 30. The reflective metal layer 40 is deposited on the top passivation layer of the array 10 and is disposed to cover the surface of the array except where a sensor 12 layer lies for exposure. Light will therefore either strike one of the sensors 12 or the reflector 40. The reflected light is scattered by the phosphor 30 and diffusely reflected back to the passivation layer 32 to be ultimately collected by one of the sensors 12. Diffuse reflectors such as the phosphor 30 are typically very efficient and so almost all of the visible light generated therein should be collected by one of the sensors 12.

In practice, the number of reflections before collection depends on the sensor fill factor. If the expected fill factor is 50%, then only 50% of the generated light by the phosphor is sensed before reflection. After a first reflection 50% of the reflected light is collected so the overall collection efficient will be 75%. When the light not sensed after the first reflection is again reflected back, another 50% will be collected, and so from the originally generated light another 12.5% can be collected. In simpler terms, every time the light is reflected, the invention will capture a half of what is left from not being collected. After about two or three reflections, almost all of the light is collected.

Figure 3:
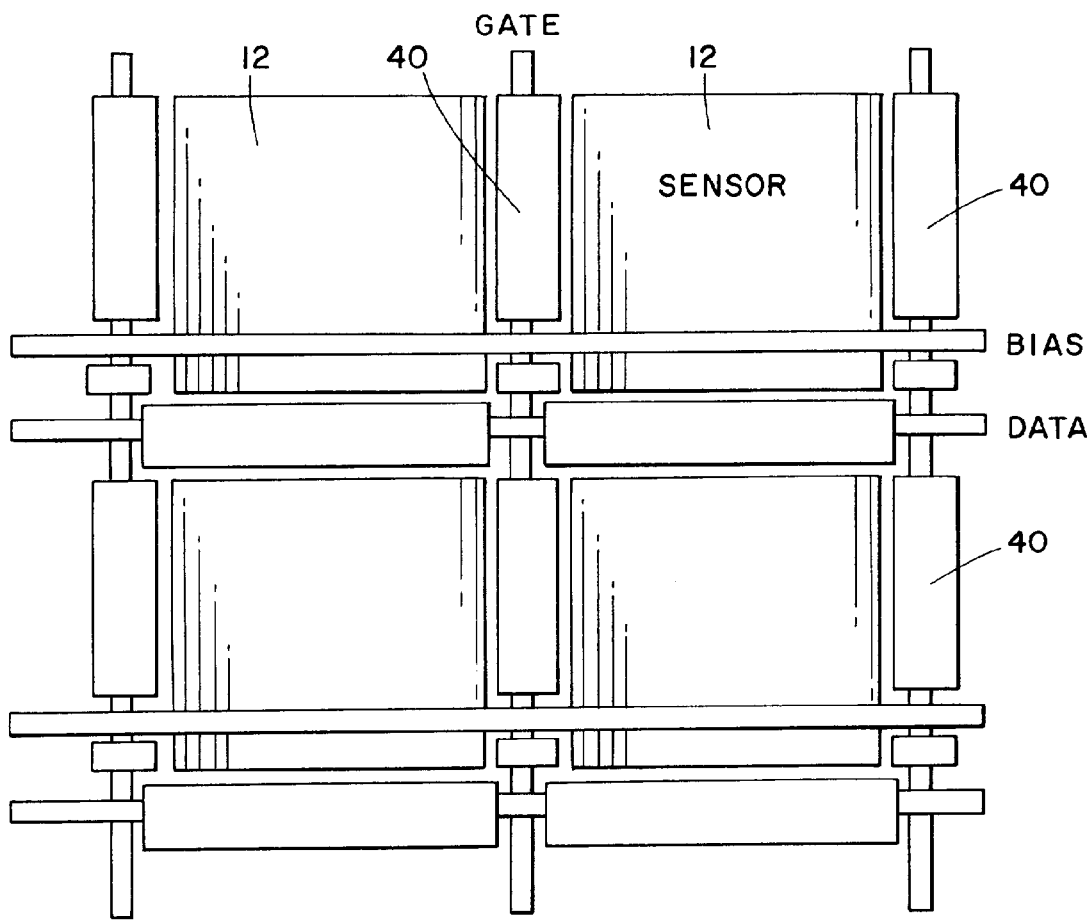

Disposition of a continuous metal overlayer comprising a reflector 40 will have the effect of introducing capacitance and cross talk effects through its interaction with the gate and data lines which lie underneath it. In order to overcome this potential problem, the subject invention preferably comprises segmenting the reflective layer 40 into many small sections and keeping them electrically isolated. There is then different sections of reflecting metal over the gate lines 16 and data lines 20 on different pixel sensors 12. FIG. 3 shows one arrangement of a plurality of segmented reflective metals layers amongst sensors 12. Since the reflective pads 40 are thus electrically floating, they do not contribute to the capacitance of the gate or data lines, and since they do not overlap different metal lines, they cannot contribute significantly to capacitive cross talk. The gaps between reflective segments 40 can be quite small, 2–3 micrometers, so that the lost reflective area is quite minimal.

One should note that the metal gate and data lines can already act as reflectors, so that not all the non-sensor area needs to be covered with the reflectors 40. Since the reflector 40 need only to function as a mirror, any convenient metals such as chromium or aluminum can be used. The invention can either be used with a separate phosphor including a screen comprising a plurality of reflectors 40 pressed up against the surface of the top passivation layer 32 or with a deposited phosphor, such as evaporated CsI(Tl) on top of the reflective layer. Alternatively, even the metal layers can be deposited on the phosphor and then aligned with the sensor array.

The practical application of the subject invention is x-ray imaging, of which the most by far important application is medical imaging. For medical imaging, sensitivity is the key attribute of the sensors because sensitivity of the imager relates directly to the x-ray dose that the patient receives. Minimizing that dosage is one of the absolute most important concerns for medical imaging. The increase in the sensitivity of the detection is thus critical to the success of the device and its most important advantage and consequence.

The invention has been described with reference to preferred embodiments. Obviously, modifications and alterations will occur to others upon the reading and understanding of this specification. It is my intention to include all such modifications and alterations in so far as they come within the scope of the appended claims or the equivalents thereof.

Having thus described my invention, I now claim:

1. An assembly for detection of radiation directed through an object comprising:

a radiation source associated with the object for generating a radiation pattern comprising incident radiation to the assembly wherein the radiation pattern is representative of an aspect of the object;

a phosphor converter disposed to receive the radiation pattern and generate visible light representative of the radiation pattern;

a plurality of light sensors disposed to define a sensor array including a plurality of pixel sensors for sensing the visible light and generating a pixel signal pattern representative of the radiation pattern;

a circuit in operative communication with the plurality of pixel sensors for generating an electrical signal pattern representative of the pixel signal pattern; and, a reflector disposed at a location relative to the phosphor converter and the pixel sensors for reflecting a portion of the visible light radiating in a direction to avoid being sensed by the plurality of pixel sensors, towards the phosphor converter and wherein diffuse reflection of the portion of the visible light in the phosphor converter reflects the light towards the sensors.

2. The assembly as defined in claim 1 wherein the reflector comprises a plurality of reflective areas disposed generally among the plurality of light sensors.

3. The assembly as defined in claim 2 wherein the plurality of reflective areas are disposed generally intermediate of the phosphor converter and the plurality of pixel sensors.

4. The assembly as defined in claim 3 wherein the plurality of reflective areas are electrically isolated.

5. The assembly of claim 1 wherein the sensor array includes a passivation layer and wherein the reflector is disposed on the passivation layer.

6. The assembly as defined in claim 1 wherein the plurality of pixel sensors are spaced in the sensor array by a plurality of intermediate spaces disposed about the pixel sensors, and the reflector is sized to cover the intermediate spaces.

7. The assembly as defined in claim 1 wherein the reflector comprises a metal including Cr or Al.

8. An imaging apparatus comprising:

a sensor array comprising a plurality of spaced amorphous silicon sensors including control circuitry for detecting electrical signals from the sensors representative of light signals incident on the sensors;

a phosphor converter for generating the light signals from radiation incident on the phosphor converter, and, a reflector positioned generally between the sensor array and the phosphor converter for intercepting light signals that would miss being sensed by the spaced sensors and for reflecting the missing light signals back into the phosphor converter for diffuse reflection back to the sensors.

9. The imaging apparatus of claim 8 wherein the reflector comprises a plurality of reflective zones disposed about the plurality of spaced sensors.

10. The imaging apparatus of claim 9 where in the reflective zones are disposed in a screen assembly on a surface of the sensor array.

11. The imaging apparatus of claim 9 wherein the reflective zones are deposited on the phosphor converter and aligned with the sensor array.

12. The imaging apparatus of claim 9 wherein the control circuitry includes reflective signal lines interposed between the sensors, and wherein the reflective zones are positioned about the reflective signal lines.

13. The imaging apparatus of claim 9 wherein the reflective zones are electrically isolated.

14. A sensor array comprising:

a plurality of amorphous silicon sensors adapted to receive light signals representative of a characteristic of an object wherein the sensors are spaced by spaces about the sensors;

a plurality of reflective areas disposed to be generally coextensive of the spaces to preclude the light signals from passing between the sensors;

a converter for converting high energy radiation into the light signals, said reflective areas being further disposed to reflect the light signals back into the converter for diffuse reflection to the sensors.

15. An optical scanner for generating an image representative of a characteristic of an object to be scanned comprising:

a light source to generate light towards the object;

a plurality of amphorphous silicon sensors disposed to define a pixel array for receiving a light signal from the light source formed in a pattern defining the object characteristic, wherein the sensors are spaced to accommodate signal lines from each of the plurality of sensors to an external control circuit;

a diffuse reflector interposed between the sensors and the light source; and, a mirror reflector disposed about the plurality of sensors to reflect a portion of the light signal radiating in a direction to miss being received by the sensors, back towards the diffuse reflector for diffuse reflection back towards the sensors.

16. The scanner as defined in claim 15 wherein the mirror reflector comprises a plurality of electrically isolated reflective zones.

17. A method of generating an image from an amorphous silicon sensor array wherein a plurality of sensors are spaced to accommodate electric signal lines comprising steps of:

radiating an object with radiation to generate a radiation pattern representative of a characteristic of the object;

converting the radiation pattern into a light pattern with a converter comprising a diffuse reflector;

sensing the light pattern with the plurality of sensors, said sensors being spaced to accommodate electric signal lines; and, reflecting a portion of the light pattern, radiating in a direction to miss being sensed by the sensors, back into the converter for diffuse reflection back towards the sensors.

* * * * *

UNITED STATES PATENT AND TRADEMARK OFFICE
CERTIFICATE OF CORRECTION

PATENT NO. : 5,936,230
DATED : August 10, 1999
INVENTOR(S) : Robert A. Street

It is certified that error appears in the above-identified patent and that said Letters Patent is hereby corrected as shown below:

Column 1, line 5, under "Background of the Invention", insert therefor --A portion of this work was done under a Federally Sponsored ARPA program, agreement number MDQ 972-94-3-0027.--

Signed and Sealed this

Fifteenth Day of August, 2000

Attest:

Q. TODD DICKINSON

*Attesting Officer*    *Director of Patents and Trademarks*